United States Patent
Zeng

(10) Patent No.: US 9,317,299 B2
(45) Date of Patent: Apr. 19, 2016

(54) METHOD AND DEVICE FOR COLD STARTING ANDROID MOBILE TERMINAL

(75) Inventor: Huipeng Zeng, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 605 days.

(21) Appl. No.: 13/808,584

(22) PCT Filed: Oct. 8, 2010

(86) PCT No.: PCT/CN2010/077584
§ 371 (c)(1),
(2), (4) Date: Jan. 6, 2013

(87) PCT Pub. No.: WO2012/016393
PCT Pub. Date: Feb. 9, 2012

(65) Prior Publication Data
US 2013/0111202 A1      May 2, 2013

(30) Foreign Application Priority Data
Aug. 6, 2010   (CN) .......................... 2010 1 0250432

(51) Int. Cl.
G06F 9/00     (2006.01)
G06F 9/44     (2006.01)

(52) U.S. Cl.
CPC .............. *G06F 9/4401* (2013.01); *G06F 9/442* (2013.01); *G06F 9/4406* (2013.01)

(58) Field of Classification Search
None
See application file for complete search history.

(56) References Cited

U.S. PATENT DOCUMENTS

| 6,243,831 | B1 * | 6/2001 | Mustafa et al. ................. 714/24 |
| 2008/0162918 | A1 | 7/2008 | Muurinen |
| 2008/0256316 | A1 | 10/2008 | Evanchik |
| 2010/0180066 | A1 | 7/2010 | Powell |

FOREIGN PATENT DOCUMENTS

| CN | 1467625 A | 1/2004 |
| CN | 1540503 A | 10/2004 |
| CN | 1834685 A | 9/2006 |

OTHER PUBLICATIONS

Supplementary European Search Report in European application No. 10855531.9, mailed on Nov. 19, 2013 (7 total pages).
International Search Report in international application No. PCT/CN2010/077584, mailed on May 26, 2011.
English Translation of the Written Opinion of the International Search Authority in international application No. PCT/CN2010/077584, mailed on May 26, 2011.

* cited by examiner

*Primary Examiner* — Kim Huynh
*Assistant Examiner* — Paul J Yen
(74) *Attorney, Agent, or Firm* — Oppedahl Patent Law Firm LLC

(57) ABSTRACT

A method and a device for cold starting an Android mobile terminal are disclosed. The method includes: the mobile terminal in standby state backs up data needing to be saved to a non-volatile storage device and then is powered off after a power supply of the mobile terminal is turned off in a fast cold starting mode; after the mobile terminal is restarted, the data backed up in the non-volatile storage device is restored to a corresponding physical memory. The advantage of the technical solution is that: by backing up the data needing to be saved, such as used pages, the efficiency of data backup and recovery is improved, and the time for cold starting of the Android mobile terminal is significantly shortened.

12 Claims, 2 Drawing Sheets

METHOD AND DEVICE FOR COLD STARTING ANDROID MOBILE TERMINAL

TECHNICAL FIELD

The disclosure relates to the technology for starting a mobile terminal, particularly to a method and a device for cold starting an Android mobile terminal.

BACKGROUND

Following the fast development of ARM CPU, memory chips of SDRAM (Synchronous Dynamic Random Access Memory)/DDR (Double Data Rate) SDRAM and non-volatile storage chips of NAND/SD cards, there has been rapid progress in the running speed and storage capacity of portable mobile terminals such as mobile phones, PDA (Personal Digital Assistant), navigators, netbooks and the like. Particularly in the technical field of mobile phones, mobile phones have been extended from conventional ordinary mobile phones supporting SMS function to Smart phones with multiple functions including Internet access, games, multimedia playing, navigation, mobile TV, Bluetooth, etc.

In order to cope with the increasingly complex applications of mobile phones, Google provides a new mobile phone operating system platform: Android system, the core of which is a modified Linux kernel, and a newly developed JAVA virtual machine. The Linux kernel may run service programs. The JAVA virtual machine may operate numerous apk application programs. The total amount of application programs and service programs included in a finished Android mobile phone is in the range of 100 MB~200 MB.

In the related art, the typical startup time for an Android mobile phone is about 1 minute from turning on the power to completion of the startup. This process mainly includes system initialization, drive loading and initialization, and loading and running of service programs and application programs, wherein the loading and running of service programs and application programs takes up most of the startup time, which significantly affects the startup speed of the Android mobile phone.

SUMMARY

Therefore, the main object of the disclosure is to provide a method and a device for cold starting an Android mobile terminal to reduce the time spent on the loading and running of service programs and application programs, thereby shortening the time an Android mobile terminal spends on the process from startup to entry of operable state.

To achieve the foregoing object, the technical solution of the disclosure is realized in the following way:

A method for cold starting an Android mobile terminal, wherein the method includes: in a fast cold starting mode, backing up, by the mobile terminal in standby state, data needing to be saved to a non-volatile storage device after a power supply of the mobile terminal is turned off, and then powering off the mobile terminal; and restoring the data backed up in the non-volatile storage device to a corresponding physical memory after the mobile terminal is restarted.

Before the power supply of a mobile terminal is turned off, the method may further include: setting up or triggering the fast cold starting mode of the mobile terminal, generating and saving a corresponding fast cold starting state variable.

Wherein backing up, by the mobile terminal in standby state, the data needing to be saved to the non-volatile storage device may specifically include: saving a physical address of a variable containing layout information of physical memory to a specified physical memory, shutting a Memory Management Unit (MMU) and running a guidance system of the mobile terminal; and after the guidance system finds out that the fast cold starting mode is set up, analyzing information of each page in the physical memory, backing up data and physical addresses of used pages in a program memory to the non-volatile storage device, setting up a logo of successful backup, and powering off the mobile terminal.

Wherein restoring the data backed up in the non-volatile storage device to a corresponding physical memory may specifically include: restoring, by a guidance system, physical addresses of used pages in a program memory in last standby state, Android kernel, and root file system to the corresponding physical memory, and removing a logo of fast cold starting mode and a logo of successful backup.

After the data backed up in the non-volatile storage device are restored to the corresponding physical memory, the method may further include: waking up, by the guidance system, the mobile terminal and making the mobile terminal recover to a page before standby and enter an operable state.

A device for cold starting an Android mobile terminal includes: a standby saving module and a data recovery module; wherein the standby saving module is configured to, in a fast cold starting mode, make the mobile terminal in standby state back up data needing to be saved to a non-volatile storage device after a power supply of the mobile terminal is turned off, and then power off the mobile terminal; and the data recovery module is configured to restore the data backed up in the non-volatile storage device to a corresponding physical memory after the mobile terminal is restarted.

The device may further include a state variable generation module configured to generate and save a corresponding fast cold starting state variable by setting up or triggering the fast cold starting mode of the mobile terminal.

Wherein backing up, by the standby saving module, the data needing to be saved to the non-volatile storage device may specifically include: saving a physical address of a variable containing layout information of physical memory to a specified physical memory, shutting an MMU and running a guidance system of the mobile terminal; and after the guidance system finds out that the fast cold starting mode is set up, analyzing information of each page in the physical memory, backing up data of used pages and physical addresses of the used pages in a program memory to the non-volatile storage device, setting up a logo of successful backup, and powering off the mobile terminal.

Wherein restoring, by the data recovery module, the data backed up in the non-volatile storage device to the corresponding physical memory may specifically include: restoring physical addresses of used pages in a program memory in last standby state, Android kernel, and root file system to the corresponding physical memory, and removing a logo of fast cold starting mode and a logo of successful backup.

The device may further include: a wake-up module configured to wake up the mobile terminal and make the mobile terminal restore to a page before standby and enter an operable state.

The advantage of adopting the method and device described in the disclosure is that through backing up the data needing to be saved, such as: used pages, the efficiency of data backup and recovery is improved and the cold starting time of the Android mobile terminal is shortened greatly. Further, in a fast cold starting mode, the data in the program memory are saved in a non-volatile storage device. This ensures the data in the program memory will not be lost easily after power-off of the mobile terminal, and the data can be quickly restored to the state before standby when the Android mobile terminal is restarted.

DETAILED DESCRIPTION

The basic idea of the disclosure is that: Regarding an Android mobile terminal, in a fast cold starting mode, after the power supply of the mobile terminal is turned off, the mobile terminal backs up in standby state the data needing to be saved in a non-volatile storage device and then the mobile terminal is powered off; after the mobile terminal is restarted, the data backed up in the non-volatile storage device are restored to a corresponding physical memory.

Figure 1:
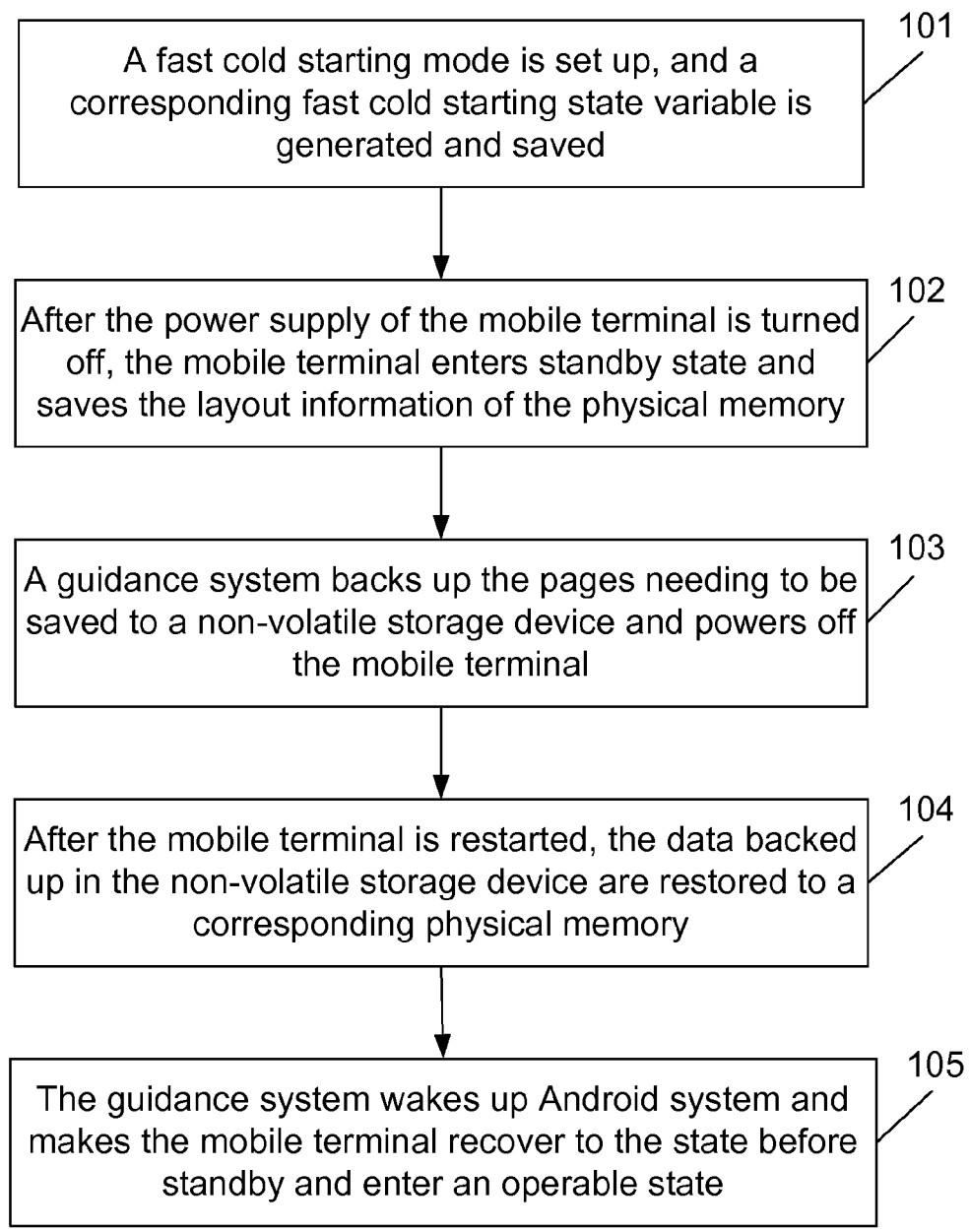
FIG. 1 is a flow diagram of a method for cold starting an Android mobile terminal in an embodiment of the disclosure.

For easy description, the Android mobile terminal is referred to as mobile terminal below. The method for cold starting an Android mobile terminal provided in the disclosure, as shown in FIG. 1, includes the following steps:

S101: A fast cold starting mode is set up, and a corresponding fast cold starting state variable is generated and saved.

In this step, a fast cold starting mode is added to the Setting menu of the mobile terminal, and after a user sets up a fast cold starting mode in the Setting menu, a corresponding state variable will be generated and saved in a public area, such as CPU register, physical memory, or a non-volatile storage device, that is accessible to the power management module and the guidance system of the mobile terminal; in this embodiment, after a fast cold starting mode is set up, a fast_coldboot file containing the state variable will be generated and saved in the file system of a mobile operating system in the non-volatile storage device.

S102: After the power supply of the mobile terminal is turned off, the mobile terminal enters standby state and saves the layout information of the physical memory.

In this step, after the user presses down the power button of the mobile terminal and is ready to turn off the power supply, the mobile terminal enters standby state by invoking the interface of the power management module. In this state, application programs are frozen, and then various driver programs begin to enter sleep mode, so this state may ensure the application programs, driver programs and their threads are all in static state in the physical memory, and all field data, service programs, application programs, and driver programs are saved in the physical memory. In this state, most peripherals enter a power-off state to save power, and only the physical memory is in power-on state to maintain data.

In standby state, the power management module queries whether there is a fast_coldboot file denoting a fast cold starting state variable in the file system of a mobile operating system in the non-volatile storage device. If such a fast_coldboot file is found, then the physical address of Android kernel global variable contig_page_data will be saved to a specified physical memory such as an empty address in the reserved memory; the power management module shuts MMU, jumps to the entry address of the guidance system, and runs the guidance system. The global variable contig_page_data contains layout information of the physical memory so that the guidance system can get the usage condition of each page in the physical memory. If the power management module does not find the fast_coldboot file, a normal shutdown flow will be executed.

Figure 2:
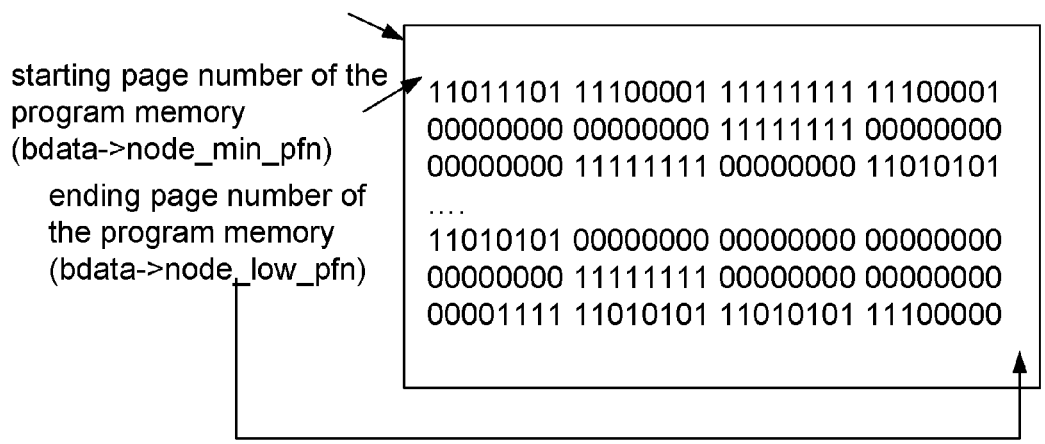
FIG. 2 is a data structure chart of contig_page_data structure and member variables in an embodiment of the disclosure.

As shown in FIG. 2, the global variable contig_page_data is a structure variable. pcontig_page_data denotes the pointer pointing at the structure variable, and the pointer variable bdata pointed at by the pcontig_page_data includes three important data, which are, respectively:

node_bootmem_map//page usage condition mapping table node_min_pfn//starting page number of program memory node_low_pfn//ending page number of program memory In FIG. 2, the traversed page range may be obtained through node_min_pfn and Node_low_pfn. The size of each page is 4 KB. 4 KB times a page number gives the physical address corresponding to the page, so the range of the traversed physical memory may also be calculated. node_bootmem_map pointer points at the page usage condition mapping table, in which each bit stands for the usage condition of a page. For example, bit=1 means the page has been used, and bit=0 means the page is unused. One byte may record the usage conditions of eight pages, so the size of this mapping table mapsize=(node_low_pfn−node_min_pfn)/8 Byte.

S103: The guidance system backs up the pages needing to be saved in a non-volatile storage device, and powers off the mobile terminal.

In this step, after the guidance system finds out that a fast cold starting mode has been set up, the guidance system analyzes the information of each page in the physical memory to determine the pages needing to be saved, wherein many types of data, including the guidance system, Android kernel, root file system, reserved memory, program memory (Program RAM) and so on, are saved in the physical memory. Wherein data such as the guidance system, Android kernel, root file system are already saved in a non-volatile storage device during the design of the mobile terminal and therefore do not require backup. Reserved memory may be selectively backed up according to specific circumstances. The program memory takes up most part of the entire physical memory and consists of unused pages and used pages. The used pages save the application programs and service programs of the mobile terminal in standby state, driver programs, and the field data needed during wakeup of Android. Thus the guidance system only needs to back up the pages in the physical memory that have been used by the foregoing programs.

By analyzing the information of each page in the physical memory, the guidance system skips the unused pages and backs up the used page data and physical addresses in a non-volatile storage device, which may reduce the workload of backup and saves the time spent in restoring the foregoing data during cold starting of the mobile terminal.

In this embodiment, the guidance system backs up the used page data and physical addresses in a non-volatile storage device through the following specific process: the guidance system searches the physical address where the structure variable contig_page_data is saved in the reserved memory, and gets to know the physical addresses of the pages needing to be backed up according to the page usage condition mapping table and the starting and ending page numbers of the program memory.

A structure backupstruct for managing pages and physical addresses is defined as follows:

```
typedef struct __backupstruct {
    u32 signature;   //signature for judging whether the structure is valid.
    u32 startpfn;    //saving the physical address of the starting page of the program memory
    u32 endpfn;      //saving the physical address of the ending page of the program memory
    u32 free;        //number of unused pages
    u32 notfree;     //number of used pages
    u32 usedarray[MAXPAGENUM];   //sequentially saving the physical addresses of the used pages
} backupstruct,* pbackupstruct;
```

In the structure backupstruct, the guidance system sequentially writes the physical addresses of the pages needing to be backed up into the array usedarray, traversingly assigns values to members such as signature, startpfn, endpfn, notfree, and free according to the page usage condition mapping table and the physical addresses of the starting and ending page numbers of the program memory, and saves the structure backupstruct to the specified area of the non-volatile storage device so that the mobile terminal can obtain the necessary data upon being repowered. Lastly, the guidance system consecutively writes, by unit of 4 K, the data of each page needing to be backed up into the specified area of the non-volatile storage device, sets up the logo of successful backup, and then disconnects the power supply by controlling GPIO (General Purpose Input Output). By now, the mobile terminal is in shutdown state and does not consume battery power.

S104: After the mobile terminal is restarted, the data backed up in a non-volatile storage device are restored to corresponding physical memory.

In this step, the user presses down the power button again to restart the mobile terminal. upon repowering of the mobile terminal, the guidance system is started in the first place. After determining that the logo of fast cold starting mode and the logo of successful backup are both in setup state, the guidance system reads from the non-volatile storage device the saved data, including: the physical addresses of the used pages in the program memory, Android kernel, root file system, and other data. Then, data such as the physical addresses of the used pages in the program memory in last standby state, Android kernel, and root file system are restored into a corresponding physical memory, and the logo of a fast cold starting mode and the logo of successful backup are removed.

In this embodiment, the guidance system restores the saved data from a non-volatile storage device to a physical memory through the following specific process: reads the structure backupstruct saved in the specified area of the non-volatile storage device, restores firstly the structure backupstruct in the physical memory, and judges whether the member variable signature is valid. Assuming that the member variable is valid when the value of signature is nonzero. When signature is valid, obtains the physical addresses and number of the pages needing to be restored from member variables such as startpfn, endpfn, notfree, free, usedarray, and sequentially restores, by unit of 4 K, the physical addresses of the pages saved in the array usedarray in the corresponding physical memory. In the foregoing process, based on different reading speed of non-volatile storage devices, it generally takes about 10~15 s to restore 128 M of data. upon restoration of the program memory, Android kernel, root file system and other data are moved or decompressed from the non-volatile storage device to the specified area of the physical memory through an existing normal startup flow of the guidance system, which is identical to the related art and will not be elaborated here.

S105: The guidance system wakes up Android system and makes the mobile terminal recover to the state before standby and get into an operable state.

In this step, after data are fully restored to the physical memory, the guidance system opens the MMU page table, restores Android virtual memory mapping, jumps to the PC pointer address of Android of the time of standby, wakes up Android system, and restores driver programs, making the mobile terminal recover to the state before standby and finally light up the screen to enter an operable state, by which time the fast startup process is completed. This process is identical to the standby/wakeup process of the related art and will not be elaborated here.

Since by default most drive programs on current Android terminals support the function of re-initialization of hardwares after wakeup, various hardware modules are restored to the state before standby. However, certain drive modules do not have this function, for example: the wireless module of a mobile phone remains powered and active in standby, so the drive program thereof will not carry out extra initialization operation in the wakeup flow. Therefore, when a mobile phone is started by this method, its wireless module is unable to continue to work. Such modules may be improved by referring to the drive programs with a wakeup initialization flow to ensure the feasibility of this method, which will not be elaborated here.

With the method of the disclosure, on a platform of 700 M main frequency, 256 Mbytes RAM, and 512 M NAND card, and with a NAND card reading speed of 10 Mbytes/s, it takes about 10~15 s to restore 128 M of memory data, 1 s for the guidance system to move or decompress about 5 M of Android kernel, root file system, and other data, and about 3 s to wake up the Android system and restore the drive. Therefore, theoretically the fast cold starting described in the disclosure may be completed in about 17~22 s, whereas in a common cold starting, it needs about 40 s for normal startup. Plus about 20 s spent for user operations to enter the application program interface, the total time needed is about 1 min. Thus it can be seen that the disclosure is able to significantly save the time for cold starting of a mobile terminal.

Further, the mobile terminal is powered off after it backs up the data needing to be saved in a non-volatile storage device in standby state, which not only enables the mobile terminal to recover to the state before standby after it is re-powered, but also can save battery power. For example, when a user needs to shut down the mobile terminal without interrupting the present application program, the user may shut down the mobile terminal after setting up the function of fast cold starting. After the mobile terminal is restarted, it may be quickly restored to the application program interface before shutdown, saving the user's waiting time and operation procedures and greatly facilitating user usage.

Further, the non-volatile storage device adopted by the disclosure may be NAND card, SD card, or micro hard disk. Further, in S101, the disclosure is not limited to setup of a fast cold starting mode by a user via the Setting menu. Alternatively, the mobile terminal may automatically trigger a fast cold starting mode to generate a fast cold starting state variable when the setup conditions are met. For example, when the mobile terminal is underpowered, a fast cold starting mode may be triggered automatically to generate and save a fast cold starting state variable, and back up the pages in follow-up steps to protect the current state of the mobile terminal and ensure system recovery once normal power supply is resumed.

Figure 3:
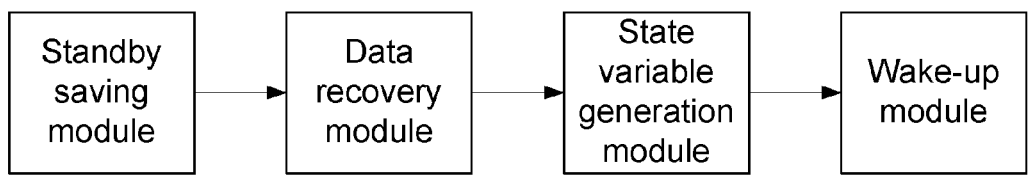
FIG. 3 is a structural schematic view of a device for cold starting an Android mobile terminal in an embodiment of the disclosure.

To realize the foregoing method, the disclosure further provides a device for cold starting an Android mobile terminal. As shown in FIG. 3, this device includes: a standby saving module and a data recovery module, wherein the standby saving module is configured to make the mobile terminal enter standby state and back up the data needing to be saved in a non-volatile storage device after the power supply of the mobile terminal is turned off;

the data recovery module is configured to restore the data backed up in the non-volatile storage device to a corresponding physical memory after the mobile terminal is restarted.

The device further includes a state variable generation module, which is configured to generate and save a corresponding fast cold starting state variable through setting up or triggering a fast cold starting mode of the mobile terminal.

The backup of the data needing to be saved by the standby saving module to a non-volatile storage device specifically includes: saving the physical address of the variable containing layout information of physical memory to the specified physical memory when the power management module of the mobile terminal finds out the existence of a fast cold starting state variable, shutting the MMU, and running the guidance system of the mobile terminal; analyzing, by the guidance system, the information of each page in the physical memory after the guidance system finds out that a fast cold starting mode is set up, backing up the used page data and physical addresses in the program memory to a non-volatile storage device, and powering off the mobile terminal after setup of a logo of successful backup.

The restoration of the data backed up in a non-volatile storage device by the data recovery module to a corresponding physical memory specifically includes: after the guidance system determines that both the logo of fast cold starting mode and the logo of successful backup are in setup state, restoring data such as the physical addresses of the used pages in the program memory in last standby state, Android kernel, and root file system to a corresponding physical memory and removing the logo of fast cold starting mode and the logo of successful backup.

The device further includes: a wake-up module, which is configured to wake up the mobile terminal and make the mobile terminal recover to the page before standby and get into an operable state.

The foregoing descriptions are merely preferred embodiments of the disclosure and are not intended to limit the scope of the disclosure. Any modifications, identical replacements and improvements made within the spirit and principles of the disclosure shall fall in the protection scope of the disclosure.

What is claimed is:

1. A method for cold starting an Android mobile terminal, comprising:
   in a fast cold starting mode, backing up, by the mobile terminal in standby state, data needing to be saved to a non-volatile storage device after a power supply of the mobile terminal is turned off, and then powering off the mobile terminal; and
   restoring the data backed up in the non-volatile storage device to a corresponding physical memory after the mobile terminal is restarted,
   wherein backing up, by the mobile terminal in standby state, the data needing to be saved to the non-volatile storage device specifically comprises:
   when it is determined that there is a fast coldboot file denoting a fast cold staring state variable in a file system of a mobile operating system in the non-volatile storage device, saving a physical address of a variable containing layout information of physical memory to a specified physical memory, running a guidance system of the mobile terminal; wherein the layout information of physical memory is used for making the guidance system to get a usage condition of each page in the physical memory, which comprises: page usage condition mapping table, starting page number of program memory, and ending page number of program memory; and
   after the guidance system finds out that the fast cold starting mode is set up, analyzing information of each page in the physical memory, only backing up data of used pages and physical addresses of the used pages in a program memory to the non-volatile storage device, setting up a logo of successful backup, and powering off the mobile terminal.

2. The method according to claim 1, further comprising: before the power supply of the mobile terminal is turned off, setting up or triggering the fast cold starting mode of the mobile terminal, generating and saving a corresponding fast cold starting state variable.

3. The method according to claim 1, wherein restoring the data backed up in the non-volatile storage device to a corresponding physical memory specifically comprises: restoring, by a guidance system, the physical addresses of used pages in a program memory in the last standby state, the Android kernel, and the root file system to the corresponding physical memory, and removing a logo of fast cold starting mode and a logo of successful backup.

4. The method according to claim 1, further comprising: after restoring the data backed up in the non-volatile storage device to the corresponding physical memory, waking up, by the guidance system, the mobile terminal and making the mobile terminal recover to a page before standby and enter an operable state.

5. A device for cold starting an Android mobile terminal, comprising: a standby saving module and a data recovery module; wherein
   the standby saving module is configured to, in a fast cold starting mode, make the mobile terminal in standby state back up data needing to be saved to a non-volatile storage device after a power supply of the mobile terminal is turned off, and then power off the mobile terminal; and
   the data recovery module is configured to restore the data backed up in the non-volatile storage device to a corresponding physical memory after the mobile terminal is restarted,
   wherein backing up, by the standby saving module, the data needing to be saved to the non-volatile storage device specifically comprises:
   when it is determined that there is a fast coldboot file denoting a fast cold starting state variable in a file system of a mobile operating system in the non-volatile storage device, saving a physical address of a variable containing layout information of physical memory to a specified physical memory, running a guidance system of the mobile terminal; wherein the layout information of physical memory is used for making the guidance system to get a usage condition of each page in the physical memory, which comprises: page usage condition mapping table, starting page number of program memory, and ending page number of program memory; and
   after the guidance system finds out that the fast cold starting mode is set up, analyzing information of each page in the physical memory, only backing up data of used pages and physical addresses of the used pages in a program memory to the non-volatile storage device, setting up a logo of successful backup, and powering off the mobile terminal.

6. The device according to claim 5, further comprising a state variable generation module configured to generate and save a corresponding fast cold starting state variable by setting up or triggering the fast cold starting mode of the mobile terminal.

7. The device according to claim 5, wherein restoring, by the data recovery module, the data backed up in the non-volatile storage device to the corresponding physical memory specifically comprises: restoring the physical addresses of used pages in a program memory in the last standby state, the Android kernel, and the root file system to the corresponding physical memory, and removing a logo of fast cold starting mode and a logo of successful backup.

8. The device according to claim 5, further comprising a wake-up module configured to wake up the mobile terminal and make the mobile terminal recover to a page before standby and enter an operable state.

9. The method according to claim 2, further comprising: after restoring the data backed up in the non-volatile storage device to the corresponding physical memory, waking up, by the guidance system, the mobile terminal and making the mobile terminal recover to a page before standby and enter an operable state.

10. The method according to claim 3, further comprising: after restoring the data backed up in the non-volatile storage device to the corresponding physical memory, waking up, by the guidance system, the mobile terminal and making the mobile terminal recover to a page before standby and enter an operable state.

11. The device according to claim 6, further comprising a wake-up module configured to wake up the mobile terminal and make the mobile terminal recover to a page before standby and enter an operable state.

12. The device according to claim 7, further comprising a wake-up module configured to wake up the mobile terminal and make the mobile terminal recover to a page before standby and enter an operable state.

* * * * *